(12) United States Patent
Lin et al.

(10) Patent No.: US 12,443,287 B2
(45) Date of Patent: Oct. 14, 2025

(54) ELECTRONIC DEVICE AND OPERATION METHOD THEREOF

(71) Applicant: InnoLux Corporation, Miao-Li County (TW)

(72) Inventors: Cheng-Wei Lin, Miao-Li County (TW); Ruey-Jer Weng, Miao-Li County (TW); Po-Lung Wu, Miao-Li County (TW); Ting-Hao Guo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 72 days.

(21) Appl. No.: 18/488,387

(22) Filed: Oct. 17, 2023

(65) Prior Publication Data

US 2024/0168568 A1 May 23, 2024

Related U.S. Application Data

(60) Provisional application No. 63/427,448, filed on Nov. 22, 2022.

(30) Foreign Application Priority Data

Jun. 26, 2023 (CN) .......................... 202310760126.8

(51) Int. Cl.
*G06F 3/01* (2006.01)
*G06T 7/246* (2017.01)
*G06V 10/77* (2022.01)
*G06V 40/20* (2022.01)

(52) U.S. Cl.
CPC .............. *G06F 3/017* (2013.01); *G06T 7/248* (2017.01); *G06V 10/77* (2022.01); *G06V 40/28* (2022.01); *G06T 2207/10028* (2013.01); *G06T 2207/30196* (2013.01)

(58) Field of Classification Search
None
See application file for complete search history.

(56) References Cited

U.S. PATENT DOCUMENTS

2024/0028109 A1* 1/2024 Soelberg ................. A63F 13/53

\* cited by examiner

*Primary Examiner* — Samira Monshi
(74) *Attorney, Agent, or Firm* — McClure, Qualey & Rodack, LLP

(57) ABSTRACT

An electronic device includes an image capturing module and a processing module. The image capturing module is configured to capture a hand to obtain a first hand image. The processing module is configured to receive the first hand image, process the first hand image through an artificial intelligence model to generate a first hand landmark, and control the electronic device to enter the unlock mode according to a first gesture corresponding to the first hand landmark.

16 Claims, 7 Drawing Sheets

ELECTRONIC DEVICE AND OPERATION METHOD THEREOF

CROSS REFERENCE TO RELATED APPLICATIONS

This application claims priority of U.S. Provisional Application No. 63/427,448, filed Nov. 22, 2022, and China Patent Application No. 202310760126.8, filed on Jun. 26, 2023, the entirety of which is incorporated by reference herein.

BACKGROUND OF THE DISCLOSURE

Field of the Disclosure

The disclosure relates to an electronic device, and in particular, to an electronic device with gesture control and an operation method thereof.

Description of the Related Art

In a conventional control system, most operations need to be operated through auxiliary tools (such as a mouse, etc.), which may affect of the experience of the user. If users are able to more intuitively control the operation of control systems using their hands and various hand gestures, user experience may be improved. However, most gesture control systems focus on function-calling, instead of controlling objects. This may still affect the experience of the user. Therefore, a new design for a circuit structure is needed to solve the problem described above.

BRIEF SUMMARY OF THE DISCLOSURE

An embodiment of the disclosure provides an electronic device, which includes an image capturing module and a processing module. The image capturing module is configured to capture a hand to obtain a first hand image. The processing module, configured to receive the first hand image, process the first hand image through an artificial intelligence model to generate a first hand landmark, and control the electronic device to enter the unlock mode according to a first gesture corresponding to the first hand landmark.

An embodiment of the disclosure provides an operation method of an electronic device, which includes the following step. An image capturing module is used to capture a hand to obtain a first hand image. A processing module is used to receive the first hand image, process the first hand image through an artificial intelligence model to generate a first hand landmark, and control the electronic device to enter the unlock mode according to a first gesture corresponding to the first hand landmark.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
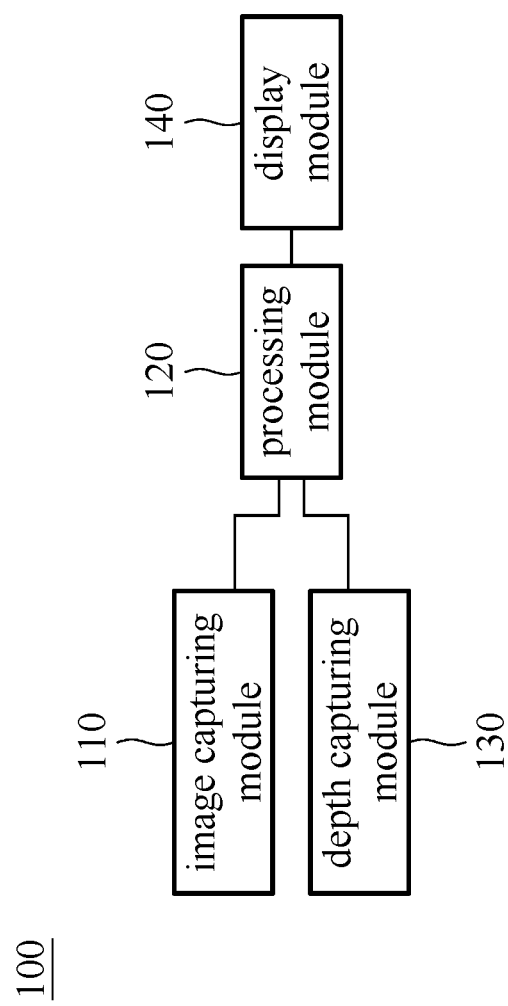
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" or "electrically connected" may include any direct and indirect means of electrical connection.

In the text, the terms "substantially" or "approximately" usually means within 20%, or within 10%, or within 5%, or within 3%, or within 2%, or within 1%, or within 0.5% of a given value or range. The quantity given here is an approximate quantity. That is, without the specific description of "substantially" or "approximately", the meaning of "substantially" or "approximately" may still be implied.

The "including" mentioned in the entire specification and claims is an open term, so it should be interpreted as "including or comprising but not limited to".

Furthermore, "connected or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. The electronic device 100 of the disclosure may be applied to a surgery support display system, a smart home control system, a gesture control in cars and an interaction with digital bulletin board, but the disclosure is not limited thereto. Please refer to FIG. 1. The electronic device 100 may at least include an image capturing module 110 and a processing module 120.

The image capturing module 110 is configured to capture a hand to obtain a first hand image. In the embodiment, the image capturing module may be a color video camera, but the disclosure is not limited thereto.

The processing module 120 may be electrically connected to the image capturing module 110. In some embodiments, the processing module 120 may include a microprocessor, a micro control unit (MCU), or another suitable processor, but the disclosure is not limited thereto. In some embodiments, the processing module 120 may include a central processing unit (CPU) and a graphics processing unit (GPU), but the disclosure is not limited thereto.

Figure 2:
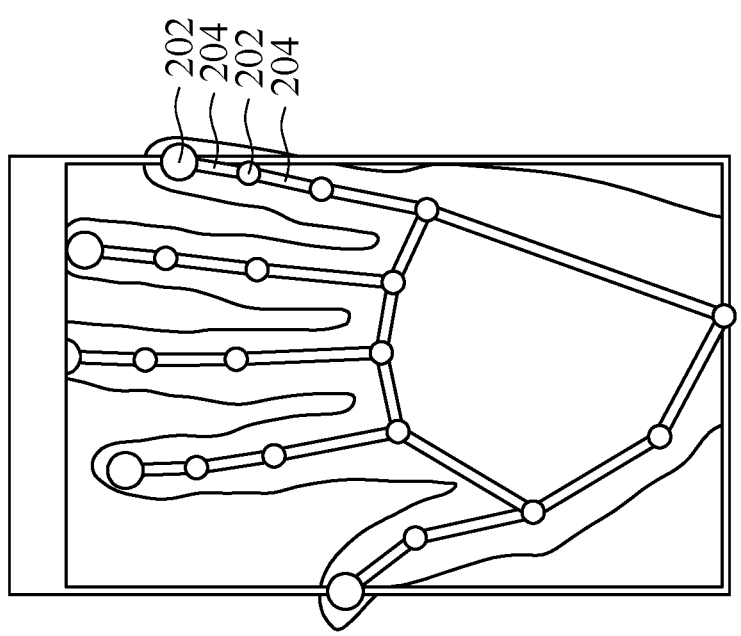
FIG. 2 is a schematic view of a hand landmark according to an embodiment of the disclosure.

The processing module 120 may receive the first hand image from the image capturing module 110. Then, the processing module 120 may process the first hand image through an artificial intelligence model (AI model) to generate a first hand landmark. In the embodiments, the first hand landmark may include the points 202 of the hand and the connecting lines 204 between the points 202, as shown in FIG. 2, but the disclosure is not limited thereto.

Afterward, the processing module 120 may control the electronic device 100 to enter the unlock mode according to a first gesture corresponding to the first hand landmark. For example, after the processing module 120 obtains the first hand landmark, the processing module 120 may obtain the first gesture corresponding to the first hand landmark according to the first hand landmark. Then, the processing module 120 may compare the first gesture with a predetermined unlock gesture to determine whether the first gesture matches the predetermined unlock gesture.

When the processing module 120 determines that the first gesture matches the predetermined unlock gesture, the processing module 120 may unlock the electronic device 100 and control the electronic device 100 to enter the unlock mode for subsequent operations. When the processing module 120 determines that the first gesture does not match the predetermined unlock gesture, the processing module 120 may not unlock the electronic device 100, so that the electronic device 100 is still in the locked mode. Therefore, it may avoid the situation that the electronic device 100 generates the error operation, so as to increase the convenience and safety of use.

In the embodiment, the electronic device 100 may further include a depth capturing module 130. The depth capturing module 130 may be electrically connected to the electronic device 120. The depth capturing module 130 is configured to capture the hand to obtain depth information, and the depth capturing module 130 may transmit the obtained depth image to the processing module 120, so that the processing module 120 may perform the subsequent processing. In the embodiment, the depth capturing module 130 may be a depth image camera, but the disclosure is not limited thereto. In FIG. 1, the image capturing module 110 and the depth capturing module 130 are disposed separately, but the disclosure is not limited thereto. In some embodiments, the image capturing module 110 and the depth capturing module 130 may be integrated into one module, and the module may be a charge coupled device (CCD) with a field of view (FOV) or another suitable camera with a field of view, but the disclosure is not limited thereto.

In some embodiments, when the electronic device 100 enters the unlock mode, the processing module 120 may further receive a second hand image through the image capturing module 110. Then, the processing module 120 may process the second hand image through the artificial intelligence model to generate a second hand landmark. Afterward, the processing module 120 may generate a first operation according to a second gesture corresponding to the second hand landmark and the depth information.

In some embodiments, the second gesture may include a pinch motion of at least two fingers, but the disclosure is not limited thereto. For example, in some embodiments, the pinch motion of the two fingers may include the pinch of the thumb and the forefinger (i.e., the connection between the fingertips of the thumb and the forefinger), the pinch of the thumb and the middle finger (i.e., the connection between the fingertips of the thumb and the middle finger), the pinch of the thumb and the ring finger (i.e., the connection between the fingertips of the thumb and the ring finger) and the pinch of the thumb and the little finger (i.e., the connection between the fingertips of the thumb and the little finger).

In some embodiments, the pinch motion of the three fingers may include the pinch of the thumb, the forefinger and the middle finger (i.e., the connection between the fingertips of the thumb, the forefinger and the middle finger), the pinch of the thumb, the middle finger and the ring finger (i.e., the connection between the fingertips of the thumb, the middle finger and the ring finger) and the pinch of the thumb, the ring finger and the little finger (i.e., the connection between the fingertips of the thumb, the ring finger and the little finger). The pinch motion of the four fingers or the pinch motion of the five fingers may be deduced by analogy. In addition, the above pinch motion of the at least two fingers (such as the pinch motion of the two fingers, the pinch motion of the three fingers, etc.) may simulate the "press" of a mouse click, and the motion of separating fingers may simulate the "release" of the mouse click, but the disclosure is not limited thereto.

In some embodiments, the above first operation may include a scaling operation, a moving operation, a rotating operation, etc., but the disclosure is not limited thereto. In the embodiment, when the depth information is zero, it indicates that the hand does not move, and the processing module 120 may determines that the hand does not generate movement amount. When the depth information is not zero, it indicates that the hand has moved, and the processing module 120 may determine that the hand generate the movement amount.

The processing module 120 of the embodiment may set the adjustable scaling of a gesture recognition. In the embodiment, the adjustable scaling is, for example, a scaling of the moving distance of the hand and the object corresponding to the first operation. For example, when the moving distance of the hand is 1 cm, the scaling or the moving distance of the object is 1.5 times. When the moving distance of the hand is 2 cm, the scaling or the moving distance of the object is 3 times, but the disclosure is not limited thereto. Therefore, it is convenient for the user to perform corresponding operation in an environment where the hand may not move greatly, so as to increase the convenience of use.

In some embodiments, when the electronic device 100 enters the unlock mode, the processing module 120 further receive the third hand image through the image capturing module 110. Afterward, the processing module 120 may process the third hand image through the artificial intelligence model to generate a third hand landmark, and generate a second operation according to a third gesture corresponding to the third hand landmark and the depth information. In some embodiments, when the depth information is zero, it indicates that the hand does not move, and the processing module 120 may determines that the hand does not generate movement amount. When the depth information is not zero, it indicates that the hand has moved, and the processing module 120 may determine that the hand generate the movement amount.

In some embodiments, the third gesture may be a numeral, and the second operation may include a view switching operation, but the disclosure is not limited thereto. For example, when the third gesture is the numeral "1", the second operation may be an upward viewing angle. When the third gesture is the numeral "2", the second operation may be a downward viewing angle. When the third gesture is the numeral "3", the second operation may be a left viewing angle. When the third gesture is the numeral "4", the second operation may be a right viewing angle. When the third gesture is the numeral "5", the second operation may be a front viewing angle. When the third gesture is the numeral "6", the second operation may be a rear viewing angle, but the disclosure is not limited thereto. Therefore, the above embodiment may generate different operations through the change of different gestures, so as to increase the convenience of use.

In some embodiments, when the electronic device 100 enters the unlock mode, the processing module 120 may further receive a fourth hand image through the image capturing module 110. Then the processing module 120 may process the fourth hand image through the artificial intelligence model to generate a fourth hand landmark. Afterward, the processing module 120 may select an operation mode according to a fourth gesture corresponding to the fourth hand landmark and the depth information.

Then, in the above operation mode, the processing module 120 may further receive a fifth hand image through the image capturing module 110. Then, the processing module 120 may process the fifth hand image through the artificial intelligence model to generate a fifth hand landmark. Afterward, the processing module 120 may generate a third operation according to a fifth gesture corresponding to the fifth hand landmark and the depth information. In some embodiments, when the depth information is zero, it indicates that the hand does not move, and the processing module 120 may determines that the hand does not generate movement amount. When the depth information is not zero, it indicates that the hand has moved, and the processing module 120 may determine that the hand generate the movement amount.

In the embodiment, the fourth gesture may be a numeral, and the above operation mode may include a scaling operation mode, a moving operation mode, a rotating operation mode, etc., but the disclosure is not limited thereto. For example, when the fourth gesture is the numeral "1", the operation mode may be the scaling operation mode. When the fourth gesture is the numeral "2", the operation mode may be the moving operation mode. When the fourth gesture is the numeral "3", the operation mode may be the rotating operation mode, but the disclosure is not limited thereto. In addition, the above third operation may include the scaling operation, the moving operation and the rotating operation.

Therefore, the above embodiment may select different operation modes through the change of different gestures, and perform the corresponding operation according to a gesture in the selected operation mode, so as to increase the convenience of use.

In some embodiments, when the electronic device 100 enters the unlock mode, the processing module 120 may receive a sixth hand image through the image capturing module 110. Then, the processing module 120 may process the sixth hand image through the artificial intelligence model to generate a sixth hand landmark. Afterward, the processing module 120 may control the electronic device 100 to enter the locked mode according to a sixth gesture corresponding to the sixth hand landmark. For example, after the processing module 120 obtains the sixth hand landmark, the processing module 120 may obtain the sixth gesture corresponding to the sixth hand landmark according to the sixth hand landmark. Then, the processing module 120 may compare the sixth gesture with a predetermined locked gesture to determine whether the sixth gesture matches the predetermined locked gesture.

When the processing module 120 determines that the sixth gesture matches the predetermined locked gesture, the processing module 120 may lock the electronic device 100 and control the electronic device 100 to enter the locked mode, so that the electronic device 100 is in an idle mode. When the processing module 120 determines that the sixth gesture does not match the predetermined locked gesture, the processing module 120 may not lock the electronic device 100, so that the electronic device 100 is still in the unlock mode. Therefore, it may avoid the situation that the electronic device 100 generates the error operation, so as to increase the convenience and safety of use.

In some embodiments, when the electronic device 100 enters the unlock mode, the processing module 120 may track the hand corresponding to the first hand image, so that the processing module 120 may use the hand image of the hand (such as the second hand image, the third hand image, the fourth hand image, the fifth hand image or the sixth hand image) and the corresponding gesture thereof (such as the second gesture, the third gesture, the fourth gesture, the fifth gesture or the sixth gesture) as the basis for subsequent operations. Therefore, it may effectively avoid the occurrence of error operation of the electronic device 100 caused by multiple hands in the same space, so as to increase the convenience of use.

In the embodiment, the processing module 120 tracking the hand corresponding to the first hand image obtained by the image capturing module 110 is an exemplary embodiment of the disclosure, but the disclosure is not limited thereto. In other embodiments, the image capturing module 110 may also capture another limb other than the hand to obtain a limb image, and transmit the limb image to the processing module 120. Then, the processing module 120 may track the limb corresponding to the above limb image, may identify the above limb image and the action thereof, and generate the corresponding operation accordingly.

In the embodiment, the electronic device 100 further include a display module 140. The display module 140 may be electrically connected to the processing module 120. The display module 140 may display the first operation, the second operation or the third operation according to the first operation, the second operation or the third operation generated by the processing module 120. In the embodiment, the display module 140 may be a display, etc., but the disclosure is not limited thereto.

In the embodiment, the operation generated by the processing module 120 may be classified as a static action or a dynamic motion. In some embodiments, the static action may refer to a part of an operation as a "single instruction", such as the view switching operation included in the above second operation. For the display module 140, it needs to receive a "switching" instruction from the processing module 120 once, and immediately perform a "switching" operation corresponding to the above "switching" instruction.

The dynamic motion may refer to a part of an operation as a "continuous movement", and the movement amount of the "continuous movement" is related to the movement distance of the hand of user, such as the scaling operation mode, the moving operation mode or the rotating operation mode included in the above first operation or the above third operation. The operation of the dynamic motion is not completed in an instant, but a continuous motion. That is, the operation of the dynamic motion may include three parts of instructions: a "start moving", a "moving process", and an "end moving". Therefore, the dynamic motion is different from the static action. Since the dynamic motion require the instructions of the "start moving" and the "end moving", the instructions included in the dynamic motion may include the pinch motion of at least two fingers, i.e., the "press" of the mouse click corresponds to the "start moving", and the "release" of the mouse click corresponds to the "end moving". In addition, the operation of the "moving process" may include the depth information. In the operation of the "moving process", the processing module 120 may determine through the pixel movement of the hand image obtained by the image capturing module 110 or the change of the depth information, and the processing module 120 generates the corresponding "moving process" operation according to the above determination of the movement amount of the hand.

Figure 3:
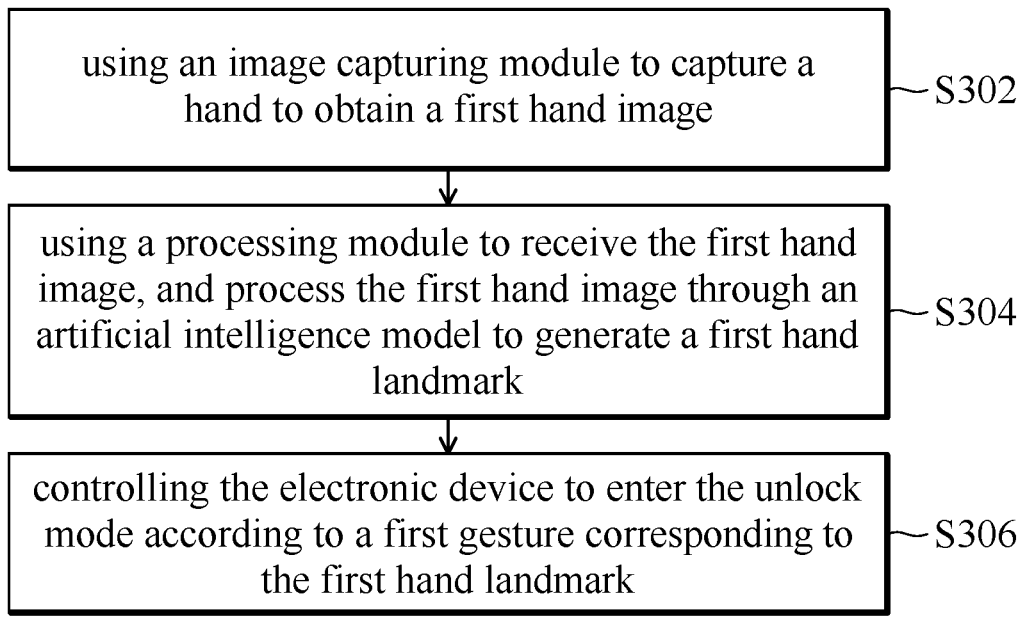
FIG. 3 is a flowchart of an operation method of an electronic device according to an embodiment of the disclosure.

FIG. 3 is a flowchart of an operation method of an electronic device according to an embodiment of the disclosure. Please refer to FIG. 3. In step S302, the method involves using an image capturing module to capture a hand to obtain a first hand image. In step S304, the method involves using a processing module to receive the first hand image, and process the first hand image through an artificial intelligence model to generate a first hand landmark. In step S306, the method involves controlling the electronic device to enter the unlock mode according to a first gesture corresponding to the first hand landmark. In some embodiments, the processing module may adjust a zoom ratio of a gesture recognition.

Figure 4:
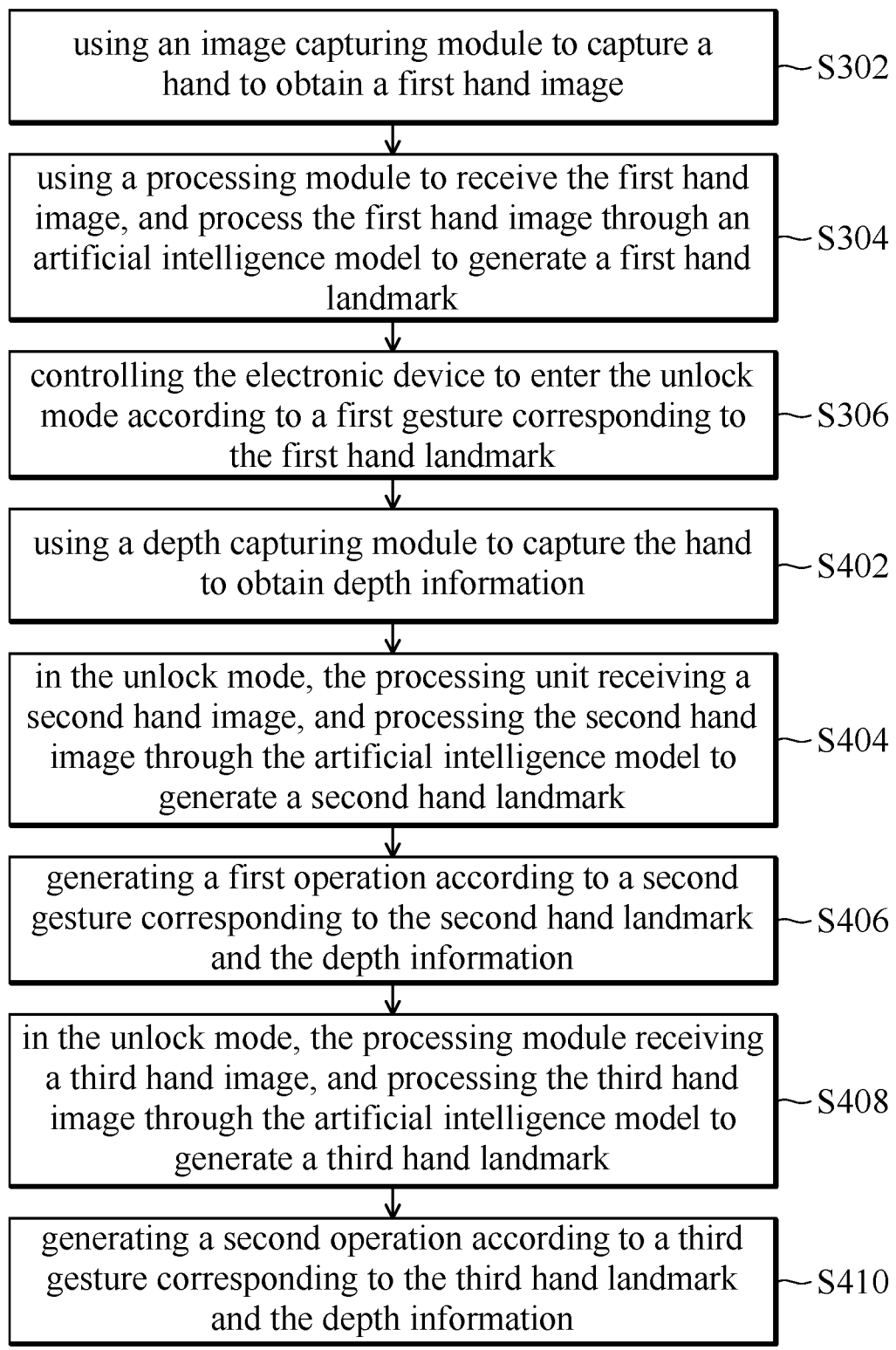
FIG. 4 is a flowchart of an operation method of an electronic device according to another embodiment of the disclosure.

FIG. 4 is a flowchart of an operation method of an electronic device according to another embodiment of the disclosure. In the embodiment, steps S302~S306 in FIG. 4 are the same as or similar to steps S302~S306 in FIG. 3. Accordingly, steps S302~S306 in FIG. 4 may refer to the description of the embodiment of FIG. 3, and the description thereof is not repeated herein.

In step S402, the method involves using a depth capturing module to capture the hand to obtain depth information. In step S404, the method involves in the unlock mode, the processing unit receiving a second hand image, and processing the second hand image through the artificial intelligence model to generate a second hand landmark. In step S406, the method involves generating a first operation according to a second gesture corresponding to the second hand landmark and the depth information.

In step S408, the method involves in the unlock mode, the processing module receiving a third hand image, and processing the third hand image through the artificial intelligence model to generate a third hand landmark. In step S410, the method involves generating a second operation according to a third gesture corresponding to the third hand landmark and the depth information. In some embodiments, the first operation may include a scaling operation, a moving operation and a rotating operation. In addition, the second operation may include a view switching operation.

Figure 5:
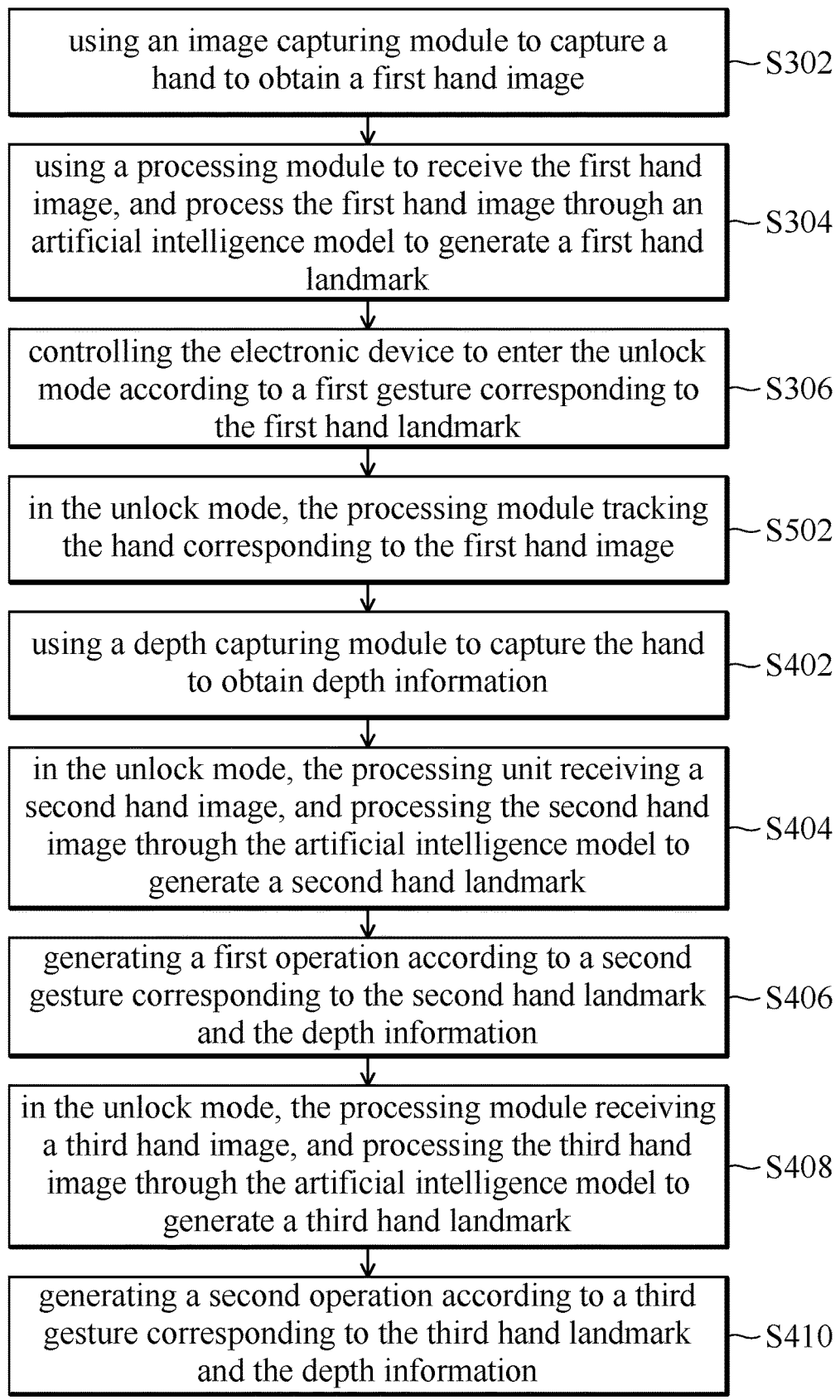
FIG. 5 is a flowchart of an operation method of an electronic device according to another embodiment of the disclosure.

FIG. 5 is a flowchart of an operation method of an electronic device according to another embodiment of the disclosure. In the embodiment, steps S302~S306 and S402~S410 in FIG. 5 are the same as or similar to steps S302~S306 and S402~S410 in FIG. 4. Accordingly, steps S302~S306 and S402~S410 in FIG. 5 may refer to the description of the embodiment of FIG. 4, and the description thereof is not repeated herein. In step S502, the method involves in the unlock mode, the processing module tracking the hand corresponding to the first hand image.

Figure 6:
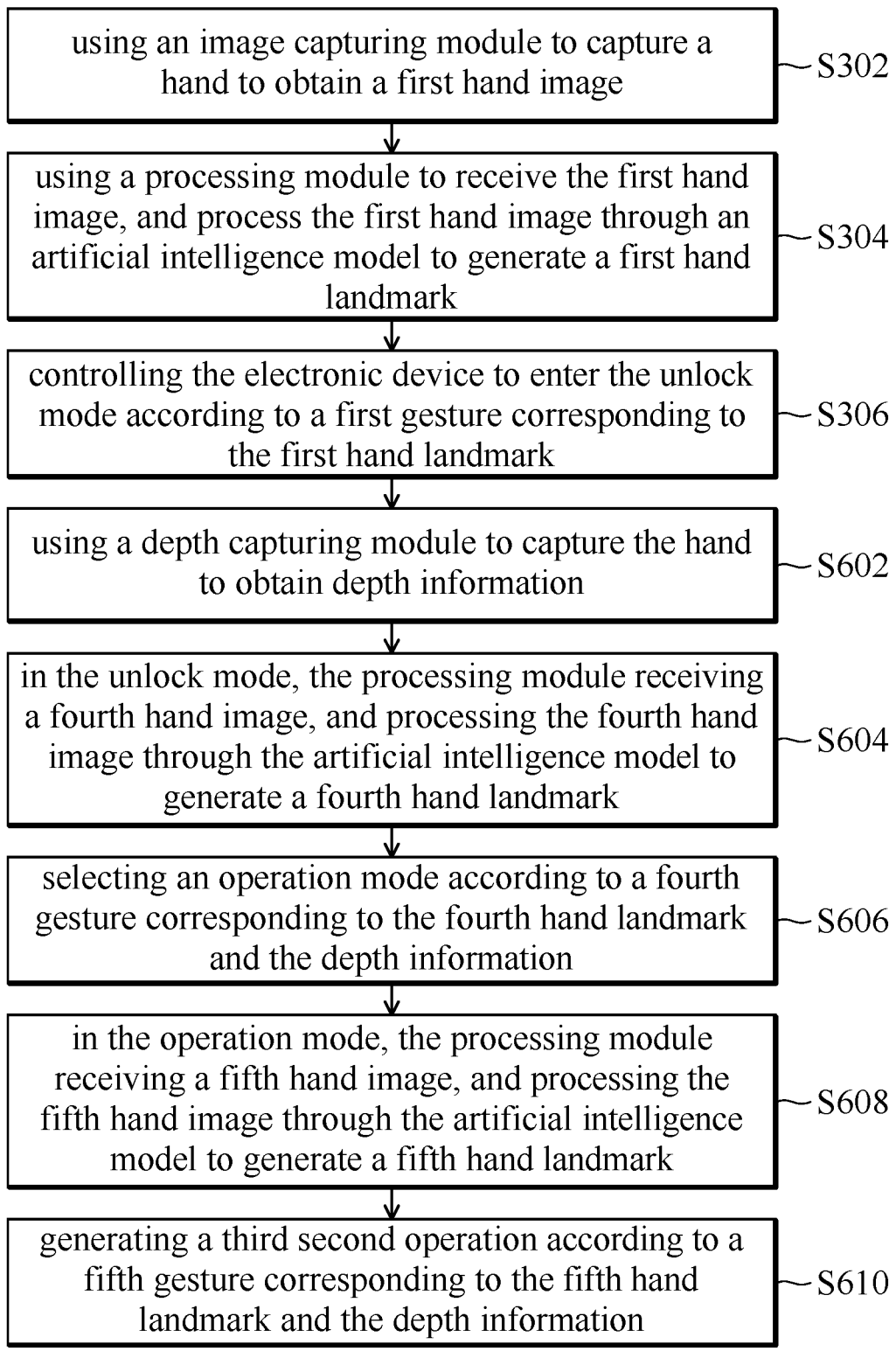
FIG. 6 is a flowchart of an operation method of an electronic device according to another embodiment of the disclosure.

FIG. 6 is a flowchart of an operation method of an electronic device according to another embodiment of the disclosure. In the embodiment, steps S302~S306 in FIG. 6 are the same as or similar to steps S302~S306 in FIG. 3. Accordingly, steps S302~S306 in FIG. 6 may refer to the description of the embodiment of FIG. 3, and the description thereof is not repeated herein.

In step S602, the method involves using a depth capturing module to capture the hand to obtain depth information. In step S604, the method involves in the unlock mode, the processing module receiving a fourth hand image, and processing the fourth hand image through the artificial intelligence model to generate a fourth hand landmark. In step S606, the method involves selecting an operation mode according to a fourth gesture corresponding to the fourth hand landmark and the depth information. In step S608, the method involves in the operation mode, the processing module receiving a fifth hand image, and processing the fifth hand image through the artificial intelligence model to generate a fifth hand landmark. In step S610, the method involves generating a third second operation according to a fifth gesture corresponding to the fifth hand landmark and the depth information. In some embodiments, the third operation may include the scaling operation, the moving operation and the rotating operation.

Figure 7:
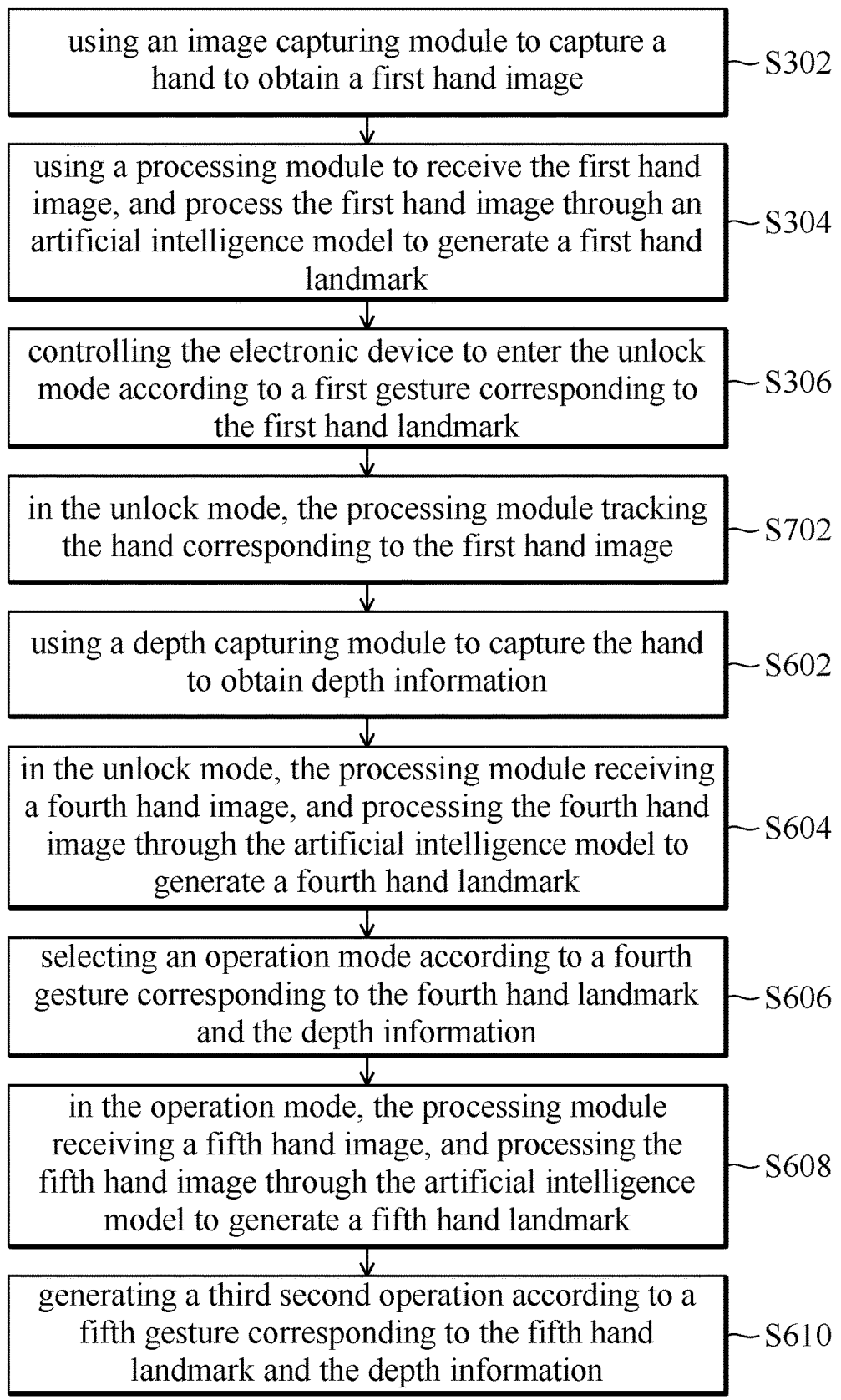
FIG. 7 is a flowchart of an operation method of an electronic device according to another embodiment of the disclosure.

FIG. 7 is a flowchart of an operation method of an electronic device according to another embodiment of the disclosure. In the embodiment, steps S302~S306 and S602~S610 in FIG. 7 are the same as or similar to steps S302-S306 and S602~S610 in FIG. 6. Accordingly, steps S302~S306 and S602~S610 in FIG. 7 may refer to the description of the embodiment of FIG. 6, and the description thereof is not repeated herein. In step S702, the method involves in the unlock mode, the processing module tracking the hand corresponding to the first hand image.

In summary, according to the electronic device and the operation method thereof disclosed by the embodiments of the disclosure, the image capturing module obtains the first hand image corresponding to the hand, and the processing module process the first hand image through the artificial intelligence model to generate the first hand landmark, and controls the electronic device to enter the unlock mode according to the first gesture corresponding to the first hand landmark. Therefore, it may avoid the situation that the electronic device generates the error operation, so as to increase the convenience and safety of use. In addition, the embodiment of the disclosure may further obtain the depth information corresponding to the hand through the depth capturing module. When the electronic device enters the unlock mode, the different operations may be generated through the changes of the different gestures and the depth information thereof, or the different operation modes may be selected through the changes of the different gestures, and in the selected operation mode, the corresponding operation may be performed according to a gesture and the depth information thereof. Therefore, the convenience of use may be increased. Furthermore, when the electronic device enters the unlock mode, the electronic device may be controlled to enter the lock mode according to the sixth gesture corresponding to the sixth hand landmark. Therefore, it may avoid the situation that the electronic device generates the error operation, so as to increase the convenience and safety of use.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. An electronic device, comprising:
an image capturing module, configured to capture a hand to obtain a first hand image;
a processing module, configured to receive the first hand image, process the first hand image through an artificial intelligence model to generate a first hand landmark, and control the electronic device to enter an unlock mode according to a first gesture corresponding to the first hand landmark; and
a depth capturing module, configured to capture the hand to obtain depth information;
wherein in the unlock mode, the processing module further receives a second hand image, processes the second hand image through the artificial intelligence model to generate a second hand landmark, generates a first operation according to a second gesture corresponding to the second hand landmark and the depth information, and tracks the hand corresponding to the first hand image.

2. The electronic device according to claim 1, wherein the processing module further adjusts an adjustable scaling of a gesture recognition.

3. The electronic device according to claim 1, wherein the first operation comprises a scaling operation, a moving operation and a rotating operation.

4. The electronic device according to claim 1, wherein in the unlock mode, the processing module further receives a third hand image, processes the third hand image through the artificial intelligence model to generate a third hand landmark, and generates a second operation according to a third gesture corresponding to the third hand landmark and the depth information.

5. The electronic device according to claim 4, wherein the second operation comprises a view switching operation.

6. The electronic device according to claim 1, further comprising a depth capturing module, configured to capture the hand to obtain depth information;
wherein in the unlock mode, the processing module further receives a fourth hand image, processes the fourth hand image through the artificial intelligence model to generate a fourth hand landmark, and selects an operation mode according to a fourth gesture corresponding to the fourth hand landmark and the depth information, and in the above operation mode, the processing module further receives a fifth hand image, processes the fifth hand image through the artificial intelligence model to generate a fifth hand landmark, and generates a third operation according to a fifth gesture corresponding to the fifth hand landmark and the depth information.

7. The electronic device according to claim 6, wherein the third operation comprises a scaling operation, a moving operation and a rotating operation.

8. The electronic device according to claim 1, wherein in the unlock mode, the processing module further receives a sixth hand image, processes the sixth hand image through the artificial intelligence model to generate a sixth hand landmark, and controls the electronic device to enter a locked mode according to a sixth gesture corresponding to the sixth hand landmark.

9. An operation method of an electronic device, comprising:
using an image capturing module to capture a hand to obtain a first hand image;
using a processing module to receive the first hand image, and process the first hand image through an artificial intelligence model to generate a first hand landmark;
controlling the electronic device to enter a unlock mode according to a first gesture corresponding to the first hand landmark; and
using a depth capturing module to capture the hand to obtain depth information;
in the unlock mode, the processing module receiving a second hand image, and processing the second hand image through the artificial intelligence model to generate a second hand landmark;

generating a first operation according to a second gesture corresponding to the second hand landmark and the depth information; and tracking the hand corresponding to the first hand image.

10. The operation method of the electronic device according to claim 9, wherein the processing module further adjusts an adjustable scaling of a gesture recognition.

11. The operation method of the electronic device according to claim 9, wherein the first operation comprises a scaling operation, a moving operation and a rotating operation.

12. The operation method of the electronic device according to claim 9, further comprising:
   in the unlock mode, the processing module receiving a third hand image, and processing the third hand image through the artificial intelligence model to generate a third hand landmark; and
   generating a second operation according to a third gesture corresponding to the third hand landmark and the depth information.

13. The operation method of the electronic device according to claim 12, wherein the second operation comprises a view switching operation.

14. The operation method of the electronic device according to claim 9, further comprising:
   using a depth capturing module to capture the hand to obtain depth information;
   in the unlock mode, the processing module receiving a fourth hand image, and processing the fourth hand image through the artificial intelligence model to generate a fourth hand landmark; and
   selecting an operation mode according to a fourth gesture corresponding to the fourth hand landmark and the depth information;
   in the above operation mode, the processing module receiving a fifth hand image, and processing the fifth hand image through the artificial intelligence model to generate a fifth hand landmark; and
   generating a third operation according to a fifth gesture corresponding to the fifth hand landmark and the depth information.

15. The operation method of the electronic device according to claim 14, wherein the third operation comprises a scaling operation, a moving operation and a rotating operation.

16. The operation method of the electronic device according to claim 9, further comprising:
   in the unlock mode, the processing module receiving a sixth hand image, and processing the sixth hand image through the artificial intelligence model to generate a sixth hand landmark;
   controlling the electronic device to enter a locked mode according to a sixth gesture corresponding to the sixth hand landmark.

* * * * *